US008028161B2

(12) United States Patent
Kröselberg

(10) Patent No.: US 8,028,161 B2
(45) Date of Patent: Sep. 27, 2011

(54) SYSTEM FOR NEGOTIATING SECURITY ASSOCIATION ON APPLICATION LAYER

(75) Inventor: Dirk Kröselberg, München (DE)

(73) Assignee: Siemens Aktiengesellschaft, Munich (DE)

( * ) Notice: Subject to any disclaimer, the term of this patent is extended or adjusted under 35 U.S.C. 154(b) by 593 days.

(21) Appl. No.: 10/233,013

(22) Filed: Sep. 3, 2002

(65) Prior Publication Data

US 2004/0210766 A1    Oct. 21, 2004

(30) Foreign Application Priority Data

Sep. 3, 2001    (DE) .................................. 101 42 959

(51) Int. Cl.
*H04L 29/06* (2006.01)
*H04L 9/32* (2006.01)
*G06F 7/04* (2006.01)

(52) U.S. Cl. ........ 713/152; 713/150; 713/151; 713/169; 713/171; 709/225; 726/26

(58) Field of Classification Search ........................ None
See application file for complete search history.

(56) References Cited

U.S. PATENT DOCUMENTS

| 6,330,562 | B1 * | 12/2001 | Boden et al. ................... 713/167 |
| 6,446,210 | B1 * | 9/2002 | Borza .............................. 726/4 |
| 6,732,177 | B1 * | 5/2004 | Roy ............................ 709/227 |
| 6,772,348 | B1 * | 8/2004 | Ye .................................. 726/13 |
| 6,779,004 | B1 * | 8/2004 | Zintel .......................... 709/227 |
| 6,865,681 | B2 * | 3/2005 | Nuutinen ......................... 726/14 |
| 6,915,436 | B1 * | 7/2005 | Booth et al. ....................... 726/3 |
| 6,915,437 | B2 * | 7/2005 | Swander et al. ................... 726/1 |
| 6,954,790 | B2 * | 10/2005 | Forslow ........................ 709/227 |
| 6,965,992 | B1 * | 11/2005 | Joseph et al. ................. 713/153 |
| 7,003,662 | B2 * | 2/2006 | Genty et al. .................. 713/158 |
| 7,028,335 | B1 * | 4/2006 | Borella et al. .................. 726/11 |
| 7,032,242 | B1 * | 4/2006 | Grabelsky et al. .............. 726/11 |
| 7,058,042 | B2 * | 6/2006 | Bontempi et al. ............. 370/338 |
| 7,107,464 | B2 * | 9/2006 | Shapira et al. .................. 726/15 |
| 7,496,748 | B2 * | 2/2009 | Mercer et al. ................. 713/150 |
| 2001/0042204 | A1 * | 11/2001 | Blaker et al. ................. 713/165 |
| 2002/0069278 | A1 * | 6/2002 | Forslow ........................ 709/225 |
| 2002/0075844 | A1 * | 6/2002 | Hagen ........................... 370/351 |
| 2003/0028804 | A1 * | 2/2003 | Noehring et al. ............. 713/201 |

OTHER PUBLICATIONS

Kent, Stephen and Atkinson, Randall. Request for Comments: 2401—"Security Architecture for the Internet Protocol". Publication Date: Nov. 1998. Found on the World Wide Web at: http://www.ietf.org/rfc/rfc2401.txt.*
Kruss, Peter S.; Macker, Joseph P. "Techniques and Issues in Multicast Security". Proceedings IEEE Military Communications Conference. Pub Date: Oct. 1998. Relevant pp. 1028-1032 Found on the World Wide Web at: http://ieeexplore.ieee.org/stamp/stamp.jsp?tp=&arnumber=727004.*

* cited by examiner

*Primary Examiner* — Nathan Flynn
*Assistant Examiner* — Jeremiah Avery
(74) *Attorney, Agent, or Firm* — Staas & Halsey LLP

(57) ABSTRACT

A first computer sends a list of possible security associations to a second computer in a message according to a protocol of an application layer, a security parameter index being contained in the message for each security association. The second computer selects a security association and transmits it or an indication of the security association selected by it to the first computer.

21 Claims, 2 Drawing Sheets

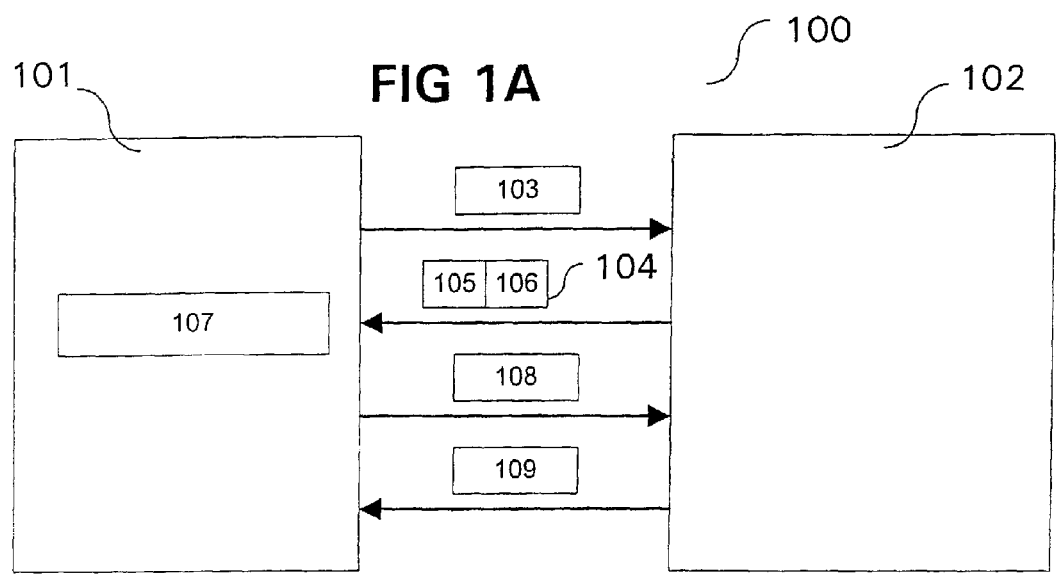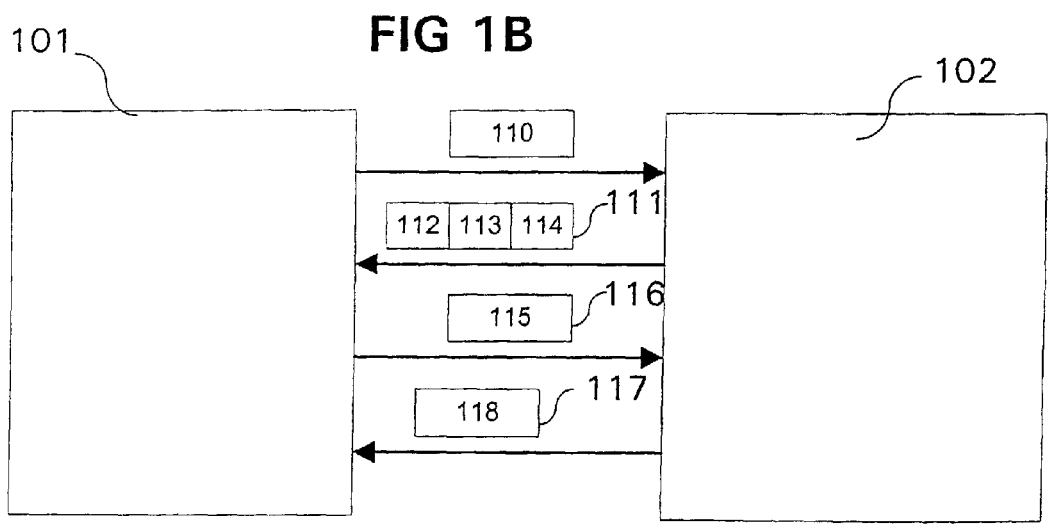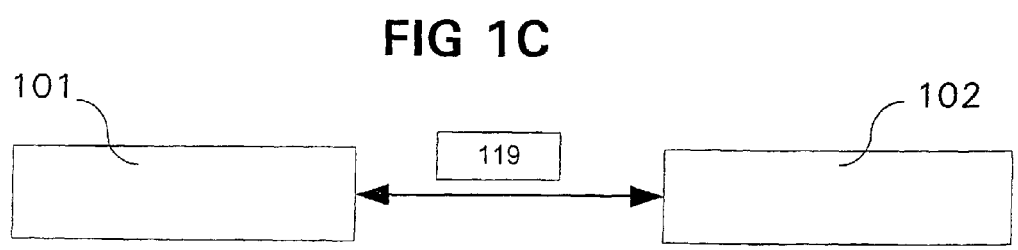

SYSTEM FOR NEGOTIATING SECURITY ASSOCIATION ON APPLICATION LAYER

CROSS REFERENCE TO RELATED APPLICATIONS

This application is based on and hereby claims priority to German Application No. 101 42 959.2 filed on Sep. 3, 2001, the contents of which are hereby incorporated by reference.

BACKGROUND OF THE INVENTION

Present-day communication systems are usually based on what is known as the OSI layer model (Open System Interconnection layer model), which shares different communication tasks between computers on different communication layers.

The hierarchically structured OSI layer model includes what is known as the application layer, on which customary application protocols, such as for example for communication between electronic mail programs, Internet browser programs or else other application programs, are executed.

Arranged hierarchically under it are what are known as network layers, which are responsible for transparent communication between computers communicating with one another and possibly switching processors lying in between in a communication link. Examples of network layers are layers which provide a communication between computers according to the Internet Protocol (IP) or according to the Transport Control Protocol (TCP) or else according to the User Datagram Protocol (UDP).

Known application protocols of layer 7, using the Internet Protocol (IP) on OSI layer 3, provide not only their core functionality but usually also a more or less extensive set of security mechanisms for the protection of the communication conducted by the application protocol (protocol on the level of the application layer in the OSI layer model). Among the security objectives to be achieved in this process, the authentication of the messages according to the application protocol and also their integrity and confidentiality are of very great importance.

Until now, two possibilities have been known for achieving these security objectives. On the one hand, the application protocol itself may be protected, that is to say a cryptographic protection may take place on the level of the application layer. Since such an application protocol on the basis of IP runs above the network layer, considered hierarchically, reference is also made in this case to an assured security on the level of the application layer. For this purpose, modifications of the application protocol itself are usually required, or the security mechanisms are already contained in the specification of the respective application protocol.

On the other hand, it is known to protect the application protocols in one of the network layers lying under the application layer, for example according to the IP or the TCP. As a solution for security on the level of the network layer, in other words on the network level, the architectures according to IPsec (see, "Understanding the IPsec Protocol Suite, Secure Virtual Private Network Solutions," Timestep Corporation, December 1998) or TLS (Transport Layer Security) are known.

IPsec represents an expansion of the Internet Protocol (IP) communication protocol of OSI layer 3, by which security services are provided on the level of the network layer. According to the IPsec protocol, cryptographic protection is provided in a transparent way for every type of application which uses the protocol according to IPsec of the network layer for communication on the level of the application layer.

As described in "Understanding the IPsec Protocol Suite, Secure Virtual Private Network Solutions," the Encapsulating Security Payload protocol (ESP) is used for IPsec to protect the user data transmitted, in particular for authentication and for encryption, and the Authentication Header (AH) protocol is used for pure authentication of the communication partners.

Within the security protocol IPsec, what are known as security associations (SA) are used between the computers communicating with one another. Such a security association is to be understood hereafter as meaning a set of security parameters for a communication link to be set up later, which include in addition to the key material to be used for a cryptographic method further parameters and security policy information, such as for example the cryptographic algorithms to be used, a maximum service life of keys or a maximum service life of the security association itself, or else identification data for identifying the communication partners.

Furthermore, the security association may also include in particular the cryptographic parameters defined in IETF RFC 2407: IP Security Domain of Interpretation, a selection of which is presented below. The security association may, for example, include:
- a security parameter index, with which the security association between two entities communicating with one another, preferably computers communicating with one another, is unequivocally identified in each case,
- a security association life type, with which the unit in which the service life of the security association is measured, optionally seconds or kilobytes, is indicated,
- a security association lifetime, in other words the indication of a point in time or a time duration until which or during which the indicated security association is valid for a communication between the two associated entities, and consequently the indicated security parameters can be used for a communication,
- an indication of an encryption algorithm to be used in a later communication link using this security association, which algorithm is used according to the ESP,
- an indication of an authentication algorithm to be used within a later communication link,
- an indication of the key length,
- an indication of possibly existing key rings to be used.

Protocols for negotiating security associations are described in IETF RFC 2409: The Internet Key Exchange (IKE) and Internet Engineering Task Force: Draft-IETF-KINK-KINK-00.txt. These independent protocols, which run independently of an application protocol, are very complex and computationally intensive and are consequently not suitable for implementation in a communication device having only a low computing capacity, in particular in a mobile communication terminal. Furthermore, according to the methods described in IETF RFC 2409 and Draft-IETF-KINK-KINK-00.txt, an independent communication is required for negotiating the security associations. To illustrate the disadvantages described above of the methods described in IETF RFC 2409 and Draft-IETF-KINK-KINK-00.txt, these methods are briefly outlined in the text which follows.

The protocol according to IETF RFC 2409 has two phases. In a first phase, what is known as an IKE security association, in other words a cryptographically protected communication channel, is produced between two computers communicating with one another. On the basis of the IKE security association, a second phase can be subsequently executed, during which the actual IPsec security associations are generated. According to IETF RFC 2409, use of what is known as the "Diffie-Hellman Key Exchange" protocol, which necessitates complex asymmetrical cryptographic computations in the computers, is required in the first phase.

In particular, the current capability of processor units in mobile communication terminals, such as mobile radio telephones, stands in the way of efficient use of this method. It should further be noted that the IKE protocol is based on the comprehensive ISAKMP standard. Altogether, the implementation of IKE is very complex and prone to errors, making the protocol only very poorly suited for communication terminals with only low computing capacity.

The protocol described in Draft-IETF-KINK-KINK-00.txt, referred to as the KINK protocol, prescribes the use of what is known as the Kerberos standard. This is likewise very extensive and complex and rather inefficient in its implementation on a mobile communication terminal with low computing capacity.

Furthermore, what is known as the Session Initiation Protocol (SIP), as described in IETF RFC 2543: Session Initiation Protocol, is an example of an application protocol. The SIP is a protocol which is defined on the level of the application layer and specifies the signaling for controlling communication sessions. Communication sessions controlled by SIP are, for example, telephone conversations or multimedia conferences over the Internet. The SIP uses either "request" messages from a client to a server, or "response" messages from a server to the client.

A further protocol on the application layer is the Hypertext Transfer Protocol (HTTP).

In Ericsson, Nokia and Nortel, "Security Mode Setup for the IMS Registration," 3GPP TSG SA WG 3 Security-S3##19, S3-010326, Jul. 4-6, 2001, it is described for a future UMTS protocol that SIP is used between a mobile communication terminal and a mobile radio network computer for negotiating which algorithm is to be used for protecting integrity. This procedure is only very poorly suited for practical implementation, since the restriction to the negotiation of an algorithm which is to be used in a future communication link for protecting integrity is not adequate to satisfy present-day requirements within the scope of mobile multimedia communication.

SUMMARY OF THE INVENTION

The invention is consequently based on the problem of negotiating a security association on the application layer between two computers which can be easily implemented and is of a more flexible form than the method described in "Security Mode Setup for the IMS Registration."

In the case of a method for the computer-aided negotiation of a security association on the application layer between a first computer and a second computer, the first computer and the second computer being coupled to one another via a telecommunication network, the first computer transmits a list of possible security associations between the first computer and the second computer to the second computer in a message according to a protocol of the application layer. A security parameter index is contained in the message for each security association contained in the list. Each security parameter index is assigned to a security association contained in the list, it being possible to use the security parameter index to identify unequivocally every security association of the list within the scope of its later application. The security association is used for determining cryptographic parameters which are used in a cryptographically protected communication link between the first computer and the second computer in a network layer, to be set up thereafter using the security association. A security association is selected by the second computer and this selected security association, or an indication of the selected security association, is transmitted from the second computer to the first computer.

It should be noted that it may alternatively be envisaged to use only one security parameter index for a number of security associations or for all the security associations contained in the list. In other words, this means that a security parameter index may also be used for a number of security associations contained in the list. The unique assignment of the security parameter index to the selected security association takes place on the basis of the selection of the security association itself. Once the selection has being made, both computers know which security association in the list is to be used. The security parameter index is then uniquely assigned to the selected security association.

In this context it should be noted that the method prescribes the existence of a session key which is used within later communication.

The security parameter index is clearly a pointer to the data structure and consequently an unequivocal designator of the data structure which describes the respective security association.

A security association is to be understood hereafter as meaning a set of security parameters for a communication link to be set up later, which include in addition to the key material to be used for a cryptographic method further parameters and security policy information, such as for example the cryptographic algorithms to be used, a maximum service life of keys or a maximum service life of the security association itself, or else identification data for identifying the communication partners.

A system for the computer-aided negotiation of a security association on the application layer between a first computer and a second computer, with the first computer and the second computer being coupled to one another via a telecommunication network, has the first computer and the second computer and the telecommunication network coupling the two computers to one another. The two computers have in each case a processor unit, which are set up in such a way that the method steps described above can be carried out.

Furthermore, according to the invention both the first computer and the second computer are set up in such a way that the method steps of the method described above that are respectively to be carried out on their side (transmitter side or receiver side) can be carried out.

Very efficient implementation of the negotiation of a security association between two computers is made possible in particular by the use of the security parameter index in the exchange of the messages for the unequivocal identification of negotiated or selected security associations. For this reason, the invention is suitable in particular for use in a technical field in which at least one of the two communication partners, that is to say one of the two computers, has only a low computing capacity.

The method is consequently suitable in particular for a scenario in which the first computer or the second computer is a mobile communication terminal and the other communication partner, respectively, is a mobile radio network computer, that is to say an interface computer of a mobile radio network.

In comparison with the methods described in IETF RFC 2409 and Draft-IETF-KINK-KINK-00.txt, the invention has the advantage in particular that no independent communication steps or protocol mechanisms have to be carried out in addition to those which proceed in any case as standard in the protocol of the application layer, for example according to the SIP. It is not required according to the invention to implement one of the extensive protocols IKE or KINK in the communicating computers. The negotiation of the security association within the application layer using the messages according to the protocol of the application layer also allows the first phase of the negotiation to be chosen independently of the actual negotiation of the security association.

Consequently, the invention is also suitable in particular for environments and scenarios which are not suitable for using the existing standard mechanisms for the negotiation of IPsec security associations on account of their restrictions with respect to the computing capacity, the digital memories present in the computers communicating with one another or the bandwidth for the transmission of the data.

In addition, there are environments, such as for example the mobile communication terminals for the future UMTS communication standard, which already have mechanisms for authentication and producing session keys. In this case, the invention can be based directly on these in any case already implemented authentication mechanisms. These already implemented standard mechanisms cannot be utilized in the case of the methods described in IETF RFC 2409 and Draft-IETF-KINK-KINK-00.txt, which in turn would lead to the implementation of such devices becoming more expensive.

Consequently, the invention is suitable in particular in a scenario in which the telecommunication network is a mobile radio telecommunication network.

The refinements of the invention described hereafter relate not only to the method and the system but also to the computers and the configuration of their processors.

The mobile communication terminal may transmit a registration message according to a protocol of the application layer to the mobile radio network computer, for example a registration request message according to SIP. The mobile radio network computer may, in response to the registration message, transmit an authentication message according to the protocol of the application layer to the mobile communication terminal, for example in turn according to SIP as the protocol of the application layer.

After the second computer has transmitted the security association selected by it or an indication of the security association selected by it to the first computer, an acknowledgement message concerning the selected security association or the indication of the selected security association may be transmitted by the first computer to the second computer. The acknowledgement message preferably contains a copy of the list of the security associations which is protected according to the cryptographic parameters determined in the security association, with the encryption method defined as the one to be used in the selected security association preferably being chosen to encrypt the indication contained in the acknowledgement message of the selected security association and consequently the respective security parameters to be chosen for a respective communication link to be cryptographically protected.

After reception of the acknowledgement message at the second computer, it is verified by the second computer and a communication link to be set up thereafter for the exchange of user data is only made if the verification was successful.

Use of an acknowledgement message further increases the degree of cryptographic security of the communication link between the first computer and the second computer.

At the beginning of the method, an authentication of the first computer and of the second computer can take place, preferably a reciprocal authentication. Within the authentication, a session key may be formed, which can be used within the security associations or used as a basis for generating further keys, which can then be used subsequently within the security association and consequently within the further communication links between the first computer and the second computer.

If the session key used for protecting the data in the protected communication link is formed separately from the messages for negotiating the further parameters of the security association, the protocol used for negotiating the security association itself may be partly unprotected, without resulting in any risk for the cryptographic security in the protected communication link. A further advantage of using the UMTS-AKA protocol is that an actually already standardized protocol can then be used, which leads to very low-cost implementation of the invention.

Use of a key derived from the session key in the encryption of the data in the protected communication link further increases the degree of cryptographic security.

According to a preferred refinement of the invention, the format described in IETF RFC 2409 is used as the format for the coding of the security associations in SIP. This format makes possible a standardized, already widespread and very efficient representation of security associations.

The protocol of the application layer may be SIP or HTTP. In particular, SIP is distinguished within the scope of the invention by being very simple to implement and by a very simple and consequently very efficient protocol for the negotiation of a security association.

Furthermore, the security association may relate to only unidirectional communication links, making it possible to protect the communication links with a finely granular cryptographic coding and consequently also to ensure for each direction of communication a different, desired degree of cryptographic security, which can also be adapted to the requirements for the security of a respective communication link, whereby a further optimization, dependent on the direction of communication, of the cryptographic security is made possible with regard to the available computing capacity and the available bandwidth of the transmittable data.

Furthermore, it is envisaged according to one refinement of the invention to transmit the security parameter index in the signaling part, that is to say in the header of the SIP message.

It should be noted in this context that the invention is suitable for every protocol of the application layer and can consequently be used in such a protocol which provides request messages and response messages between two computers, that is to say between two communication elements communicating with one another.

The invention can be clearly seen in making use of a security parameter index for the negotiation of security associations on the level of the application layer, to make it possible for security parameters that are to be used for protecting communication on the level of the network layer to be very simple, with a very low data rate and consequently very cost-efficient.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 1A to 1C are block diagrams of a system for negotiating a security association according to a first exemplary embodiment of the invention, showing message flow of the messages transmitted between the computers of the system.

DETAILED DESCRIPTION OF THE PREFERRED EMBODIMENT

Figure 2A:
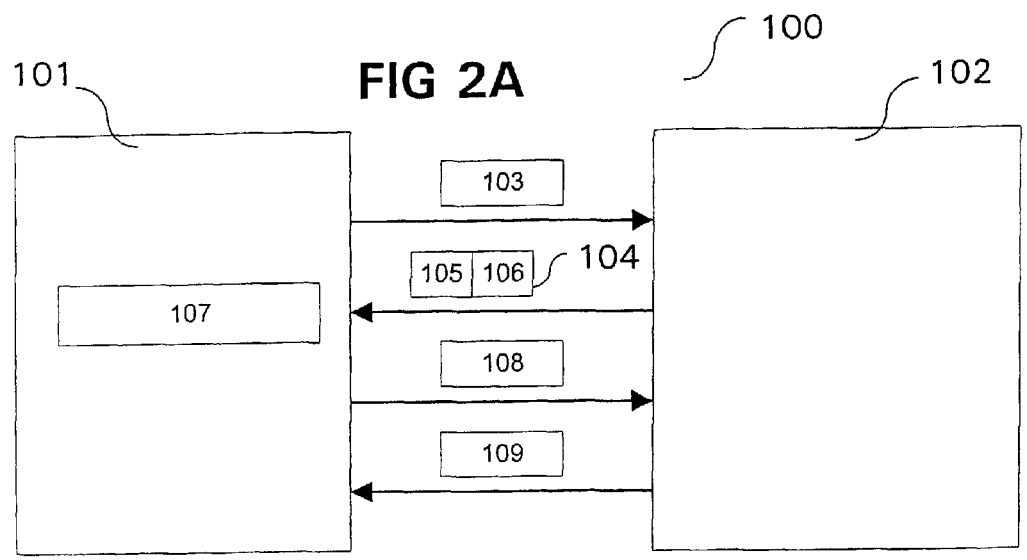
FIGS. 2A to 2C are block diagrams of a system for negotiating a security association according to a second exemplary embodiment of the invention, showing message flow of the messages transmitted between the computers of the system.

Reference will now be made in detail to the preferred embodiments of the present invention, examples of which are illustrated in the accompanying drawings, wherein like reference numerals refer to like elements throughout.

For the two exemplary embodiments further described, it is assumed that the communication system is based on the mobile radio communication standard UMTS (Universal Mobile Telecommunication System), corresponding to the known 3GPP specifications.

As described in the 3GPP specifications of the UMTS standard from Version 5, a multimedia subsystem based on the IP protocol (IP-based Multimedia Subsystem, IMS) is defined, offering, that is to say providing, multimedia services based on the Internet Protocol, and using in this context the Session Initiation Protocol (SIP) as a signaling protocol for controlling the individual communication sessions.

As represented in the UMTS system 100 shown in FIGS. 1A-1C, it has, inter alia, a mobile communication terminal 101 and also a mobile radio network computer 102, formed according to this exemplary embodiment as a proxy-CSCF (Proxy-Call State Control Function).

Implemented in the mobile communication terminal there is what is known as an SIP User Agent, that is to say a mobile agent in the form of a computer program.

As also according to the 3GPP standard, implemented on the mobile radio network side there is a proxy computer, known as the P-CSCF, which provides the required SIP functionality and is in connection both with the user agent and with the home network of the user of the mobile communication terminal via the mobile radio communication network, as described in 3GPP TSG SA WG 2: TS 23.228: Service Requirements for the IP Multimedia Core Network Subsystem.

As represented in FIG. 1A, a reciprocal authentication according to the UMTS-AKA protocol described in 3GPP T SG SA WG 3 Security: TS 33.203, Access Security for IP-Based Services (Release 5), v 0.4.0, June 2001 takes place within the registration of the mobile communication terminal 101 in an authentication phase with the IMS, in particular via the mobile radio computer 102.

Within this authentication, a common session key is formed between the mobile communication terminal 101 and the mobile radio computer 102 and is respectively stored by the two computers.

As shown in FIG. 1A, a registration request message 103 is transmitted from the mobile communication terminal to the mobile radio network computer 102 within the authentication phase according to the UMTS-AKA protocol, and is received there and decoded.

In response to this, after an identification check-back has taken place in the home network of the user according to the UMTS standard of the mobile communication terminal 101, the mobile radio network computer 102 transmits an authentication request message 104 to the mobile communication terminal 101, the authentication request message 104 containing a random number 105 and also an authentication identification indication 106. Using the random number 105, the session key is formed by the mobile radio network computer 102, according to this exemplary embodiment a symmetrical key, and is stored in a memory of the mobile radio network computer 102.

Using the random number 105, the mobile communication terminal 101 forms the session key 107, stores it and sends a second registration request message 108 to the mobile radio network computer 102.

An authentication acknowledgement message 109 is transmitted at the end of the authentication phase by the mobile radio network computer 102 to the mobile communication terminal 101 to confirm successful authentication of the mobile communication terminal 101 by the mobile radio network.

It should be noted in this context that the authentication data 108 and the computations on the network side within the authentication can be carried out both by the mobile radio network computer 102 itself and by further computers, for example computers located in the home network of the owner of the mobile communication terminal 101.

Within the actual negotiation of the security associations, as represented in FIG. 1B, the mobile communication terminal 101 sends to the mobile radio network computer 102 a registration message 110 according to SIP.

In response to the registration message 110, the mobile radio network computer 102 sends, inter alia, to the mobile communication terminal 101, in a first SIP response message 111 of the "unauthorized" type, in particular a further random number 112 and authentication data 113 and also a list 114 of security associations available for selection.

According to this exemplary embodiment, two possible security associations are proposed in the list 114 with possible security associations:
  first possible security association:
  integrity algorithm SHA-1
  first security parameter index for identification of the first security association,
  a validity time period for the first security association for 8 hours,
  second possible security association:
  integrity algorithm MD5,
  second security parameter index for identification of the second security association,
  validity time period of 4 hours for the second security association.

According to this exemplary embodiment, the security associations are coded according to the format as specified in IETF RFC 2409. The coded security associations are transmitted in the SIP messages, transparently in each case as their user data.

A desired security association, with the cryptographic parameters determined in it, is selected by the mobile communication terminal 101 and the mobile communication terminal 101 sends the selected security association 115 back to the mobile radio network computer 102 in a further SIP message 116 as security association user data.

An acknowledgement message 117, which once again contains the list of the security associations 114 as user data, is formed by the mobile radio network computer 102. The acknowledgement message 116 is cryptographically protected according to the selected security association, in particular is integrity-protected according to the integrity protection method defined in the selected security association, using the session key previously generated within the authentication.

The acknowledgement message 117 is transmitted by the mobile radio network computer 102 to the mobile communication terminal 101 and verified there.

FIG. 1C shows a subsequently set up communication link for the transmission of user data between the mobile communication terminal 101 and the mobile radio network computer 102, the user data 119 being protected using the cryptographic security mechanisms as they are defined in the selected security association 118.

Figure 2B:
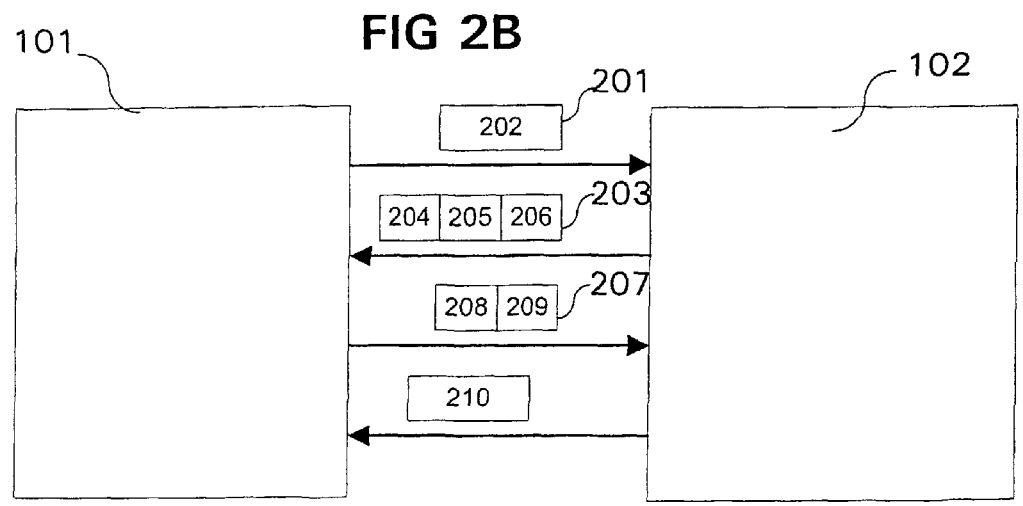
Figure 2:
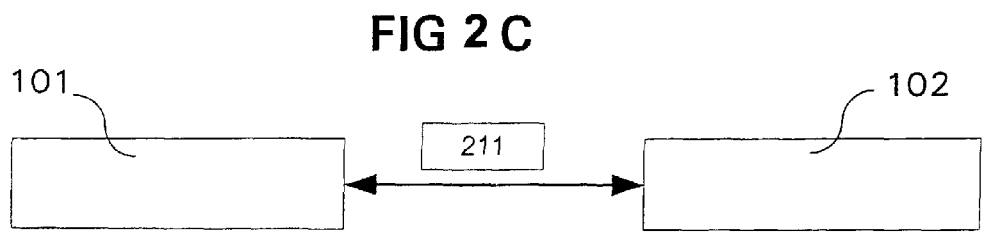

FIGS. 2A-2C show a system 200 according to the invention and the messages used within the negotiation of the security associations according to a second exemplary embodiment of the invention.

Identical elements in the first exemplary embodiment and in the second exemplary embodiment are provided with identical reference designations in the drawings.

The authentication phase according to FIG. 2A is identical to the authentication of the mobile communication terminal 101 and of the mobile radio network computer 102 in the communication system 200 carried out according to the first exemplary embodiment.

According to FIG. 2B, a negotiation of a security association is initiated in a registration message 201 by the mobile communication terminal 101, with a list 202 of possible security associations already being included in the registration message 201 according to this exemplary embodiment.

According to this exemplary embodiment, two possible security associations are proposed in the list 202 with possible security associations:
  first possible security association:
  integrity algorithm SHA-1
  first security parameter index for identification of the first security association,
  a validity time period for the first security association for 8 hours,
  second possible security association:
  integrity algorithm MD5,
  second security parameter index for identification of the second security association,
  validity time period of 4 hours for the second security association.

According to this exemplary embodiment, the security associations are coded according to the format as specified in IETF RFC 2409. The coded security associations are transmitted in the SIP messages, transparently in each case as their user data.

This clearly means for the second exemplary embodiment that the possible security associations are now proposed by the mobile communication terminal 101 and not by the mobile radio network computer 102, as according to the first exemplary embodiment.

After reception of the registration message 201 with the list 202 of possible security associations, the mobile radio network computer 102 generates and transmits a response message 203, which contains a random number 204, an authentication indication 205 and also the security association 206 selected by the mobile radio network computer 102.

After registration has taken place, the mobile communication terminal 101 transmits in a further registration message 207 both response parameters 208 and the list of security associations 202 now protected according to the selected security association, that is to say integrity-protected according to the method from the selected security association.

After its reception, the integrity-protected selected security association is verified by the network computer 102.

After successful verification of the selected security association, an acknowledgement message 210 is transmitted to the mobile communication terminal 101.

FIG. 2C then shows in the same way as FIG. 1C according to the first exemplary embodiment the set-up communication link between the mobile communication terminal 101 and the mobile radio network computer 102 and the exchange of user data 211 cryptographically protected using the selected security association 209.

It should be noted in this context that it is envisaged according to a further embodiment of the invention that the security associations are created in such a way that a cryptographic protection is used for the request messages or registration messages, that is to say a cryptographic protection is used for the communication from the mobile communication terminal 101 to the mobile radio network computer 102, but the communication from the mobile radio network computer 102 itself to the mobile communication terminal 101 remains cryptographically unprotected.

This means that it is made possible for different protection mechanisms to be negotiated, in dependence on the direction of communication of a communication link, within a security association between two computers. A number of security associations, in principle any desired number, can be negotiated per communication link between two computers, even on the level of the network port, that is to say that a number of different security associations, preferably in each case two security associations, can be negotiated, stored and used even for each logical communication link via two ports assigned to one another in a communication link.

Major advantages of the invention described above include support for the negotiation of IPsec security associations within SIP messages, without additional SIP messages being required for the negotiation of security associations. In addition, an implementation of the invention stored for example on a computer readable medium, is very efficient, made possible in particular in the case of mobile communication terminals with a low computing capacity, thereby solving a problem which has previously been unsolved in the prior art. In this context, the negotiation of the session keys preferably takes place independently of the actual negotiation of the security association, that is to say the invention is independent of the method provided for the authentication of the communication partners. As an alternative to the authentication method described above according to IETF RFC 2409, it is possible to use an authentication method which is not originally intended for the negotiation of IPsec security associations. These authentication mechanisms may then be used in combination with the method described above for negotiating IPsec security associations.

Furthermore, the invention supports the unidirectional concept of the IPsec security associations and the exchange of SIP messages. The invention makes it possible to negotiate security associations with different contents for the protection of an individual communication link. It is consequently possible for example to protect only SIP requests, that is to say request messages, and to send SIP responses only in an unprotected form, whereby a considerable optimization with regard to the cryptographic requirements with respect to the available bandwidth and computing capacity is made possible.

The invention has been described in detail with particular reference to preferred embodiments thereof and examples, but it will be understood that variations and modifications can be effected within the spirit and scope of the invention.

What is claimed is:

1. A method for computer-aided negotiation of a security association on an application layer between a first computer and a second computer, the first computer and the second computer being coupled to one another via a telecommunication network, comprising:
   transmitting in a first SIP-compatible message along with a random number and authentication data, a list of more than one possible security association between the first computer and the second computer from the first computer to the second computer according to SIP protocol of the application layer, an integrity algorithm, a validity time period, and a security parameter index being included for and assigned to each security association in the list, each security parameter index identifying a corresponding security association in the list, said security associations including a maximum life of the security associations;
   respectively determining cryptographic parameters for a cryptographically protected communication link in a network layer to be set up using the security association,
   selecting a security association by the second computer from among the list of more than one possible security association received using said first SIP-compatible message, and
   transmitting to the first computer in a second SIP-compatible message at least one of the security association selected by the second computer and an indication of the security association selected by the second computer to be used by the first and second computer without reselecting a new security association for the validity time period, wherein
   the first computer is a mobile communication terminal and the second computer is a mobile radio network computer and a communication link is set up using the security association selected.

2. The method as claimed in claim 1, wherein the telecommunication network is a mobile radio telecommunication network connecting another mobile communication terminal and a mobile radio network computer.

3. The method as claimed in claim 2,
   wherein the mobile communication terminal transmits a registration message according to the SIP protocol of the application layer to the mobile radio network computer, and
   wherein the mobile radio network computer transmits an authentication message according to the SIP protocol of the application layer to the mobile communication terminal.

4. The method as claimed in claim 1, further comprising transmitting an acknowledgement message from the first computer to the second computer to confirm the security association selected by the second computer for a future communication link.

5. The method as claimed in claim 4, wherein the acknowledgement message contains the selected security association in a form cryptographically protected according to the selected security association.

6. The method as claimed in claim 5, wherein the selected security association is protected in the acknowledgement message according to an integrity protection method determined in the selected security association.

7. The method as claimed in claim 6, further comprising:
   verifying the acknowledgement message by the second computer, and
   setting up a communication using the selected security association only if said verifying is successful.

8. The method as claimed in claim 7, further comprising carrying out reciprocal authentication between the first computer and the second computer prior to transmitting the list of possible security associations.

9. The method as claimed in claim 8, wherein said carrying out reciprocal authentication includes exchanging a session key between the first computer and the second computer.

10. The method as claimed in claim 9, further comprising deriving a further key from the session key for use within the security association selected by the second computer.

11. The method as claimed in claim 10, further comprising coding the security associations according to an Internet Key Exchange protocol.

12. The method as claimed in claim 11, further comprising protecting a communication relationship according to IPsec using the security associations.

13. The method as claimed in claim 12, further comprising transporting user data using Encapsulating Security Payload protocol in the network layer.

14. The method as claimed in claim 13, wherein said transmitting of the security parameter index is performed in a signaling part of a respective message according to the SIP protocol format of the application layer.

15. The method as claimed in claim 14, wherein the security association determines the cryptographic parameters to be used in the network layer for a unidirectional communication link.

16. A system for computer-aided negotiation of a security association on an application layer between a first computer and a second computer, the first computer and the second computer being coupled to one another via a telecommunication network, comprising:
   a processor in each of the first computer and the second computer programmed to transmit a first SIP-compatible message from the first computer to the second computer, the message having a random number, authentication data and a list of more than one possible security association between the first computer and the second computer according to SIP protocol of the application layer, including an integrity algorithm, a validity time period, and a security parameter index assigned to and identifying each security association in the list, the security association respectively determining cryptographic parameters used for a cryptographically protected communication link in a network layer to be set up using the security association, and
   wherein the second computer selects to select a security association from among the list of more than one possible security association received using said first SIP-compatible message, and a second SIP-compatible message is transmitted from the second computer to the first computer at least one of the security association selected by the second computer and an indication of the security association selected by the second computer to be used by the first and second computer is provided without reselecting a new security association for the validity time period, and
   the first computer is a mobile communication terminal and the second computer is a mobile radio network computer.

17. A computer, coupled to a remote computer via a telecommunication network, for negotiating a security association on an application layer between said computer and the remote computer, comprising:
   a processor programmed to transmit to the remote computer a first SIP-compatible message with a random number, authentication data and a list of more than one possible security association between the computer and the remote computer according to SIP protocol of the application layer, including a security parameter index assigned to and identifying each security association in the list, an integrity algorithm, and a validity time period, the security association respectively determining cryptographic parameters used for a cryptographically protected communication link in a network layer to be set up using the security association, and
- a processor programmed to receive in a second SIP-compatible message from the remote computer at least one of a selected security association and an indication of the selected security association selected by the remote computer from among the list of more than one possible security associations received using said first SIP-compatible message to be used by the computer and the remote computer without reselecting a new security association for the validity time period, wherein the remote computer is a mobile radio network computer.

18. A computer, coupled to a remote computer via a telecommunication network, for negotiating a security association on an application layer between the remote computer and said computer, comprising:
- a processor programmed to receive a first SIP-compatible message according to SIP protocol of the application layer, the message including a random number, authentication data and a list of more than one possible security association between the remote computer and the computer and a security parameter index assigned to and identifying each security association, an integrity algorithm, and a validity time period, the security association being used for respectively determining cryptographic parameters used for a cryptographically protected communication link in a network layer, to be set up using the security association, to select a security association from among the list of more than one possible security association received using said first SIP-compatible message, and to transmit to the remote computer in a second SIP-compatible message at least one of the security association and an indication of the security association to be used by the computer and the remote computer without reselecting a new security association for the validity time period, wherein said remote computer is a mobile radio network computer.

19. At least one computer readable recording medium storing at least one program to control at least one processor to perform a method for computer-aided negotiation of a security association on an application layer between a first computer and a second computer, the first computer and the second computer being coupled to one another via a telecommunication network, said method comprising:
    transmitting a first SIP-compatible message with a random number, authentication data and a list of more than one possible security association between the first computer and the second computer from the first computer to the second computer according to SIP protocol of the application layer, a security parameter index being included for and assigned to each security association in the list, as well as an integrity algorithm, and a validity time period, each security parameter index identifying a corresponding security association in the list;
    respectively determining cryptographic parameters for a cryptographically protected communication link in a network layer to be set up using the security association,
    selecting a security association by the second computer from among the list of more than one possible security association received using said first SIP-compatible message, and
    transmitting in a second SIP-compatible message to the first computer at least one of the security association selected by the second computer and an indication of the security association selected by the second computer to be used by the first and second computer without reselecting a new security association for the validity time period, wherein
    the first computer is a mobile communication terminal and the second computer is a mobile radio network computer.

20. A method for computer-aided negotiation of a security association on an application layer between a first computer and a second computer, comprising:
    transmitting a SIP-compatible message with a random number, authentication data and a list of more than one possible security association from the first computer to the second computer according to SIP protocol of the application layer, said security associations specifying an integrity algorithm, at least one of a maximum life of the security associations and a maximum service life of keys, one security association in the list to be used by the first and second computer without reselecting a new security association for a validity time period, wherein
    the first computer is a mobile communication terminal and the second computer is a mobile radio network computer and the second computer selects the one security association from among the list of more than one possible security association received using said first SIP-compatible message.

21. A method, comprising:
    transmitting a SIP-compatible message with a random number, authentication data and a list of more than one possible security association between a first computer and a second computer based on SIP protocol of an application layer, the security associations including, an integrity algorithm, and a maximum life of keys, one security association in the list to be used by the first and second computer without reselecting a new security association for a validity time period, and
    wherein the first computer is a mobile communication terminal and the second computer is a mobile radio network computer and the second computer selects the one security association from among the list of more than one possible security association received using said first SIP-compatible message.

* * * * *